United States Patent [19]
Kobayashi et al.

[11] Patent Number: 5,606,426
[45] Date of Patent: Feb. 25, 1997

[54] DIGITAL TIME BASE CORRECTOR FOR REPRODUCING VIDEO SIGNALS

[75] Inventors: Tadayoshi Kobayashi, Koufu; Masahiro Nakajima, Tokorozawa, both of Japan

[73] Assignees: Pioneer Video Corporation, Yamanashi; Pioneer Electronic Corporation, Tokyo, both of Japan

[21] Appl. No.: 491,536

[22] Filed: Jun. 16, 1995

Related U.S. Application Data

[63] Continuation of Ser. No. 135,991, Oct. 14, 1993, abandoned.

[30] Foreign Application Priority Data

Oct. 16, 1992 [JP] Japan ................... 4-278838

[51] Int. Cl.$^6$ .............. H04N 5/94; H04N 5/95; H04N 9/88; H04N 9/89
[52] U.S. Cl. .............. 386/49; 386/2; 386/13; 386/91
[58] Field of Search .................. 358/314, 336, 358/320, 337, 339; 348/497, 616, 617; 360/36.1, 36.2, 38.1; H04N 9/88, 9/89, 5/94, 5/95

[56] References Cited

U.S. PATENT DOCUMENTS

| | | |
|---|---|---|
| 4,063,284 | 12/1977 | Tatami . |
| 4,069,499 | 1/1978 | Ninomiya . |
| 4,796,085 | 1/1989 | Shinada ................... 348/491 |
| 4,805,040 | 2/1989 | Oku et al. . |
| 4,959,825 | 9/1990 | Okano ................... 358/339 |
| 5,239,421 | 8/1993 | Hamaguchi et al. ............ 358/336 |
| 5,241,398 | 8/1993 | Urata et al. ................. 358/336 |
| 5,245,430 | 9/1993 | Nishimura ................. 358/314 |

FOREIGN PATENT DOCUMENTS

| | | |
|---|---|---|
| 62-051894 | 6/1987 | Japan . |
| 1-93273 | 4/1989 | Japan . |
| 3-125577 | 12/1991 | Japan . |
| 4003592 | 8/1992 | Japan . |

Primary Examiner—Thai Q. Tran
Attorney, Agent, or Firm—Fish & Richardson P.C.

[57] ABSTRACT

A digital time base corrector in which a memory for correction of a time base is commonly used as a memory for correction of a drop-out and a signal process to a video signal which is replaced by a drop-out compensation is made unnecessary. The corrector has an image memory having a capacity to store the digital video signal by only two horizontal scan periods. When a drop-out occurs in the reproduction video signal, the writing operation into the image memory is inhibited. In the portion in which the drop-out occurred, the video data before about 2 H is read out in place of such a portion and the drop-out compensation is executed. Therefore, the drop-out portion is replaced by the video data of the same phase.

8 Claims, 1 Drawing Sheet

DIGITAL TIME BASE CORRECTOR FOR REPRODUCING VIDEO SIGNALS

This application is a continuation of U.S. application Ser. No. 08/135,991, filed Oct. 14, 1993, now abandoned.

BACKGROUND OF THE INVENTION

1. Field of the Invention

The present invention relates to a digital time base corrector having a drop-out compensating function in an apparatus for reproducing a video signal recorded on a recording medium.

2. Description of Background Information

When a video signal recorded on a video disc is simply demodulated and reproduced, fine jitters are included in the reproduced video signal due to an eccentric component of the video disc and the vibration of a mechanism system. This results in the time base error which causes a deviation of the reproduced video signal from a reference time base. As means for correcting such a time base error, there is known a digital time base corrector such that after the reproduced video signal has been converted into digital data by an A/D converter, it is written into a memory, and the digital data is sequentially read out synchronously with a reference timing signal in accordance with the writing order and is returned to the analog signal by a D/A converter.

As a conventional digital time base corrector, there is a corrector disclosed in Japanese Patent Kokai No. 1-93273. In such a time base corrector, there is provided a phase locked loop (PLL) circuit such that at least one of a horizontal sync signal and a color burst signal is separated and extracted from the reproduced video signal and the separated signal is supplied to the PLL circuit. The PLL circuit forms a clock signal whose phase is synchronized with a time base error included in the reproduced video signal, and the clock signal is phase-modulated by phase modulating means in accordance with a phase comparison output of phase comparing means in the PLL circuit. The clock signal after completion of the phase modulation is used as a sample timing signal of the A/D converter. The clock signal, consequently, also traces the high frequency component of the time base error and the correction is performed.

On the other hand, in such a digital time base corrector, there is a digital time base corrector having a drop-out compensating function. For example, as disclosed in Japanese Utility Model Kokai No. 3-125577, a drop-out detecting circuit to detect a drop-out of a reproduction video signal is provided, and when a drop-out is detected, the writing operation into a memory is inhibited, and digital video data which has already been stored in the memory is read out in such an inhibition operating period of time. That is, the memory is used as a 1 H delay element.

In such a conventional digital time base corrector having the drop-out compensating function, a memory capacity of the memory is set to a capacity of only 1 H (H: horizontal scan period of time) of the video signal. In case of the video signal of the NTSC system, however, since the phase of the chrominance signal is inverted by 180° for every 1 H, there is a problem such that a chrominance signal processing circuit must be separately provided in order to keep the interleave relation between the luminance signal and the chrominance signal of the video signal.

OBJECT AND SUMMARY OF THE INVENTION

It is an object of the invention to provide a digital time base corrector having a drop-out compensating function which can keep the interleave relation between the luminance signal and the chrominance signal of the video signal even when a chrominance signal processing circuit is not additionally provided.

A digital time base corrector of the invention comprises: A/D converting means for converting a reproduction video signal which is read out and reproduced from a recording medium into a digital signal; memory control means for writing the digital signal into an image memory in accordance with a write clock signal whose phase is synchronized with a time base fluctuation included in the reproduction video signal and for reading out the digital signal from the image memory in accordance with a read clock signal of a predetermined writing period; and D/A converting means for converting the read-out digital signal into the analog video signal; and drop-out detecting means for generating a drop-out detection signal when a drop-out occurs in the reproduction video signal, wherein the image memory has a capacity to store the digital signal by only two horizontal scan periods of time, and the memory control means has means for inhibiting the writing operation into the image memory in accordance with the drop-out detection signal.

In the digital time base corrector according to the invention, the image memory having the capacity to store the digital signal by only two horizontal scan periods, and when a drop-out occurs in the reproduced video signal, the writing operation into the image memory is inhibited.

DETAILED DESCRIPTION OF THE PREFERRED EMBODIMENT

Figure 1:
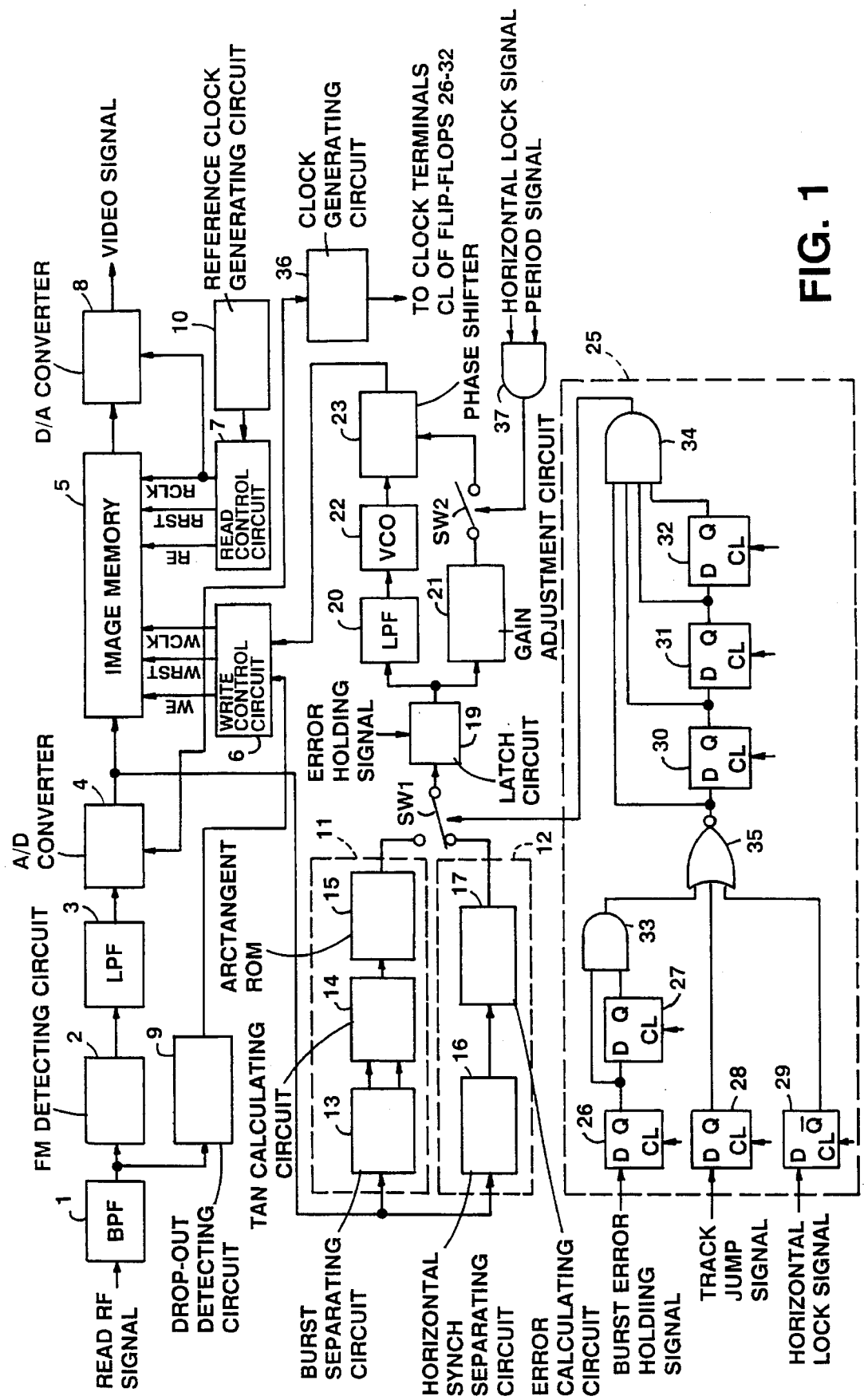
FIG. 1 is a block diagram showing an embodiment of the invention.

An embodiment of the invention will be described in detail hereinbelow with reference to the drawing.

In a digital time base corrector according to the invention shown in FIG. 1, a read RF signal generated from a pickup (not shown) of a video disc player is supplied to a BPF (band-pass filter) 1, by which only a video signal band component is derived and supplied to an FM detecting circuit 2. The video signal demodulated by the FM detecting circuit 2 is supplied to an A/D converter 4 through an LPF (low-pass filter) 3. An image memory 5 is provided for a conversion output of the A/D converter 4. The image memory 5 comprises an FIFO (First In First Out) memory and has a capacity to store the video signal of 2 H (H: horizontal scan period). The writing operation of data into the image memory 5 is controlled by a write control circuit 6. A write enable signal WE, a write reset signal WRST, and a write clock signal WCLK are supplied from the write control circuit 6 to the image memory 5. The write clock signal WCLK is also supplied as a sampling pulse to the A/D converter 4. The reading operation of data from the image memory 5 is controlled by a read control circuit 7. A read enable signal RE, a read reset signal RRST, and a read clock signal RCLK are supplied from the read control circuit 7 to the image memory 5. A reference clock generating circuit 10 is connected to the read control circuit 7. The read clock signal RCLK is generated in response to the reference clock signal, so that the reading operation is executed. The data read out from the image memory 5 is supplied to a D/A converter 8. The D/A converter 8 converts the read-out data into the analog video signal in response to the read clock signal RCLK.

A drop-out detecting circuit 9 to detect a signal drop-out is connected to an output terminal of the BPF 1. A detection output of the drop-out detecting circuit 9 is supplied to the write control circuit 6. The write control circuit 6 has a logic circuit as means for inhibiting the writing operation into the image memory. The logic circuit sets the write enable signal WE to the high level to control inhibition of the writing operation, synchronously with the write clock signal WCLK in accordance with the generation of the drop-out detection signal of the drop-out detecting circuit 9 and to set the write enable signal WE to the low level indicative of the permission of the writing operation synchronously with the write clock signal WCLK in accordance with the end of the drop-out detection signal.

A burst error forming circuit 11 and a horizontal sync error forming circuit 12 are connected to the conversion output of the A/D converter 4. The burst error forming circuit 11 has a burst separating circuit 13 for generating a color burst signal component in the digital video signal supplied from the A/D converter 4 as a sine (hereinafter, referred to as SIN) component signal and a cosine (COS) component signal. The SIN component signal and COS component signal are supplied to a tangent (TAN) calculating circuit 14, by which a TAN component signal is calculated by dividing the SIN component signal by the COS component signal. An arctangent ROM 15 is connected to an output of the TAN calculating circuit 14. An angle component as a burst error signal from the TAN component signal is generated from a predetermined table in the ROM 15. The horizontal sync error forming circuit 12 has a horizontal sync separating circuit 16 to separate and extract a horizontal sync signal component in the digital video signal supplied from the A/D converter 4. From the separated and extracted horizontal sync signal component, a horizontal sync error signal is calculated by an error calculating circuit 17 including a loop circuit by a PLL.

A change-over switch SW1 is connected to each output of the burst error forming circuit 11 and the horizontal sync error forming circuit 12. The switch SW1 selectively relays either one of the burst error signal and the horizontal sync error signal to a latch circuit 19 in accordance with a switching signal from a switching control circuit 25, which will be explained later. An LPF 20 and a gain adjusting circuit 21 are connected to the latch circuit 19. An error signal held in the latch circuit 19 is supplied to the LPF 20 and the gain adjusting circuit 21. An output signal of the LPF 20 is supplied to a VCO 22 and controls a frequency of an oscillation signal of the VCO 22. A phase shifter 23 is connected to an output of the VCO 22. An output signal of the gain adjusting circuit 21 is supplied to the phase shifter 23 through a switch SW2. When the switch SW2 is on, the phase shifter 23 controls the phase of the oscillation signal in accordance with an output signal level of the gain adjusting circuit 21. An output signal of the phase shifter 23 is supplied to the write control circuit 6.

The switching control circuit 25 comprises: seven D-type flip-flops 26 to 32; AND circuits 33 and 34; and an NOR circuit 35. That is, a burst error holding signal is supplied to a D input terminal of the flip-flop 26. A Q output terminal of the flip-flop 26 is connected to a D input terminal of the flip-flop 27 and to one input terminal of the AND circuit 33 of two inputs. A Q output terminal of the flip-flop 27 is connected to another input terminal of the AND circuit 33. A track jump signal is supplied from a tracking servo system to a D input terminal of the flip-flop 28. A horizontal lock signal which is obtained from the loop circuit in the error calculating circuit 17 is supplied to a D input terminal of the flip-flop 29. The horizontal lock signal indicates that the PLL loop circuit to form the horizontal sync error signal is locked.

The NOR circuit 35 gets the NOT-OR of the outputs of the AND circuit 33 and the flip-flops 28 and 29. The three flip-flops 30 to 32 are serially connected to an output terminal of the NOR circuit 35. The AND circuit 34 gets the AND of the outputs of the NOR circuit 35 and flip-flops 30 to 32. An output signal of the AND circuit 34 is supplied as a switching signal to the switch SW1. A 1 H clock signal of an 1 H interval is supplied from a clock generating circuit 36 to each clock terminal CL of the flip-flops 26 to 32 in accordance with the write clock signal WCLK.

The switch SW2 is turned on or off in accordance with an output signal level of an AND circuit 37. A horizontal lock signal and a period signal indicative of a period of time of at least the color burst signal of the reproduction video signal are supplied to the AND circuit 37. When the horizontal loop circuit is locked and lies within a burst signal period of time or a horizontal sync signal period of time, the AND circuit 37 is set to the high level to turn off the switch SW2.

In such a construction, the video signal demodulated by the FM detecting circuit 2 is supplied to the A/D converter 4 through the LPF 3. A digital video signal indicative of the video signal is supplied from the A/D converter 4 to the image memory 5. In the image memory 5, when the write enable signal WE from the write control circuit 6 is at the low level indicative of the permission of the writing operation, write addresses are sequentially designated in accordance with the write clock signal WCLK and the video data of one pixel is written into such addresses. For example, the video data of 910 pixels per 1 H is written. When the read enable signal RE from the read control circuit 7 is at the low level indicative of the permission of the reading operation, as for the video data written in the image memory 5, read addresses are sequentially designated in accordance with the read clock signal RCLK with a time delay of about 2 H from the writing operation and the video data of one pixel is read out from such addresses. The read-out video data is converted into the analog video signal by the D/A converter 8.

When the drop-out detecting circuit 9 detects a signal drop-out from the demodulated video signal, the drop-out detection signal is supplied from the drop-out detecting circuit 9 to the write control circuit 6. The write enable signal WE is set to the high level indicative of the inhibition of the writing operation. No video data is written into the image memory 5. The written video data is held. Namely, since the video data before 2 H has been stored at the memory position designated by the write address, the video data before 2 H is maintained as it is in the drop-out period of time during which the writing operation is inhibited. Therefore, when the video data of 1 H having a portion in which the drop-out occurred is read out from the image memory 5, the video data before 2 H is read out in the portion in which the drop-out occurred, so that the drop-out compensation is executed. Since the portion in which the drop-out occurred is replaced to the video data of the pixel unit before 2 H, the phase inverting conditions of 180° of every 1 H of the chrominance signal are held.

The video data generated from the A/D converter 4 is supplied to the burst error forming circuit 11 and the horizontal sync error forming circuit 12. In the burst error forming circuit 11, the color burst signal component in the video data is generated from the burst separating circuit 13 as an SIN component signal and a COS component signal. The SIN component signal and COS component signal are sent to the TAN calculating circuit 14, by which a TAN component signal is derived by the calculation of the SIN component/COS component. A burst error signal indicative of an arctangent is generated from the ROM 15 in correspondence to a TAN component signal. On the other hand, in the horizontal sync error forming circuit 12, the horizontal sync signal component in the video data is separated by the horizontal sync separating circuit 16 and is generated therefrom. In accordance with the horizontal sync signal component, the horizontal sync error signal is calculated by the error calculating circuit 17.

Either one of the error signals generated from the burst error forming circuit 11 and the horizontal sync error forming circuit 12 is supplied to the latch circuit 19 through the switch SW1. When the error holding signal is at the low level, the error signal is directly supplied from the latch circuit 19 to, the VCO 22 through the LPF 20. Therefore, the oscillation signal is sent from the VCO 22 to the phase shifter 23 at a frequency according to the error signal.

The level of the error signal generated from the latch circuit 19 is adjusted by the gain adjusting circuit 21. After that, when the switch SW2 is on, the level adjusted error signal is supplied to the phase shifter 23 through the switch SW2.

When the horizontal sync error signal or the burst error signal should be held, the error holding signal is set to the high level. When there is no need to hold the horizontal sync error signal or the burst error signal, the error holding signal is set to the low level. The track jump signal is set to the high level in a state in which the tracking servo loop is open. The track jump signal is set to the low level when the tracking servo loop is closed. When the horizontal loop circuit in the error calculating circuit 17 is in a locking state, the horizontal lock signal is set to the high level. When it is in an unlocking state, the horizontal lock signal is set to the low level. When the 1 H clock signal is supplied to the D-type flip-flops 26 to 32, the input level of the input terminal D is transmitted to a Q output terminal, so that the outputs of the flip-flops 26, 28, and 29 correspond to the new input level every 1 H period of time.

The flip-flop 27 and the AND circuit 33 detect a period of time during which the burst error holding signal is at the high level for 2 H. In this instance, the AND circuit 33 generates a high level output. Since the NOR circuit 35 gets the NOT-OR of the outputs of the AND circuit 33 and the flip-flops 28 and 29, there is no need to hold the burst error signal. When conditions such that the burst error holding signal is at the low level and the tracking servo loop is in a closed state and the track jump signal is at the low level and, further, the horizontal loop circuit is in a locking state and the horizontal lock signal is at the high level are satisfied, the output level of the NOR circuit 35 is set to the high level. The output signal of the NOR circuit 35 is first supplied to the flip-flop 30 and is sent to the flip-flop 31 after 1 H and is supplied to the flip-flop 32 further after 1 H.

Therefore, when the above conditions continue for 3 H or longer, the output level of the AND circuit 34 is set to the high level and is supplied to the switch SW1. When the output level of the AND circuit 34 is at the low level, the switch SW1 is set into a selecting state of the output side of the horizontal sync error forming circuit 12. When the output level of the AND circuit 34 is at the high level, the switch SW1 is set to a selecting state on the output side of the burst error forming circuit 11. When the horizontal loop circuit is in the locking state and the horizontal lock signal is at the high level and the period signal is at the high level for the generating period of time of the color burst signal and the horizontal sync signal of the reproduction video signal, the output level of the AND circuit 37 is set to the high level, so that the switch SW2 is turned off. In the other cases, the switch SW2 is turned on.

When the output level of the AND circuit 34 is at the low level and the switching conditions of the switch SW1 are not satisfied, the horizontal sync error signal is relayed by the switch SW1. Therefore, the frequency of the oscillation signal of the VCO 22 is set to a value in accordance with the horizontal sync error signal. The oscillation signal is supplied to the write control circuit 6 through the phase shifter 23, thereby deciding the generating timing of the write clock signal WCLK. In this instance, when the horizontal loop circuit is in a locked state and lies within the burst signal period of time or horizontal sync signal period of time, the switch SW2 is turned off, so that the phase of the oscillation signal is unchanged without being shifted by the phase shifter 23. When the horizontal loop circuit is in an unlocking state or doesn't lie within both of the burst signal period of time and the horizontal sync signal period of time, the switch SW2 is turned on, so that the phase of the oscillation signal is shifted by the phase shifter 23 in accordance with the gain-adjusted horizontal sync error signal, thereby executing the phase modulation.

When there is no need to hold the burst error signal and a state in which the tracking servo loop is in a closed state and, further, the horizontal loop circuit is in a locking state continues for a time interval of 3 H or longer, the switching conditions of the switch SW1 are satisfied and the switch SW1 is switched to the selecting state of the output side of the burst error forming circuit 11 in accordance with the high level output of the AND circuit 34. Since the burst error signal is relayed by the switch SW1, the frequency of the oscillation signal of the VCO 22 is set to a value according to the burst error signal. The oscillation signal is supplied to the write control circuit 6 through the phase shifter 23, thereby deciding the generating timing of the write clock signal WCLK. In this instance, when the horizontal loop circuit is in a locking state and lies within the burst signal period of time or the horizontal sync signal period of time, the switch SW2 is turned off, so that the phase of the oscillation signal is unchanged without being shifted by the phase shifter 23. When the horizontal loop circuit lies within none of the burst signal period of time and the horizontal sync signal period of time, the switch SW2 is turned on, so that the phase of the oscillation signal is shifted by the phase shifter 23 in accordance with the gain adjusted horizontal sync error signal, thereby performing the phase modulation.

The image memory has the capacity to store the video data of 2 H or more and it is also possible to use only the memory area of 2 H.

As mentioned above, in the digital time base corrector having the drop-out compensating function of the invention, the image memory having the capacity to store the digital video signal for only two horizontal scan periods is provided, and when the drop-out occurs in the reproduction video signal, the writing operation into the image memory is inhibited. Therefore, in the portion in which the drop-out occurred, the video data before 2 H is read out in place of such a portion, so that drop-out compensation is executed. Since the drop-out portion is replaced to the video data of the pixel unit before 2 H, there is no need to provide a chrominance signal processing circuit. The interleave relation between the luminance signal and the chrominance signal of the video signal is maintained by a simple construction. Thus, adverse displays such as a striped pattern or the like do not appear on the screen.

What is claimed is:

1. A digital time base corrector comprising:

an A/D converter, operating to convert a reproduction video signal which is read out and reproduced from a recording medium into a digital signal;

an image memory, having a capacity to store two lines of horizontal scanning of said video signal, one stored line of horizontal scanning representing a first video phase of said video signal, and another stored line of horizontal scanning representing a second video phase of said video signal, said first video phase being different from said second video phase;

memory control means (i) for controlling writing of said digital signal into said image memory in a way which is phase-synchronized with a write clock signal, whose phase is synchronized with a time base fluctuation included in said reproduction video signal, such that said first video phase is always stored as one stored line and said second video phase is always stored as another stored line; and (ii) for controlling reading out the digital signal from said image memory in accordance with a read clock signal of a predetermined period such that reading of the digital signal is performed at an address where writing is normally performed substantially at a time corresponding to an even multiple of a horizontal scanning period of said video signal, so that said one stored line is always retrieved during a time of the first video phase, and said another stored line is always retrieved during a time of the second video phase;

D/A converting means for converting the read-out digital signal into an analog video signal; and drop-out detecting means for determining a proper stored line depending on whether the current video phase corresponds to the video phase of said one stored line or to the video phase of said another stored line, and for generating a drop-out detection signal indicative of the proper stored line when a drop-out occurs in said reproduction video signal, wherein said memory control means has means for determining a current video phase and means for inhibiting the controlling said writing into the image memory in accordance with said drop-out detection signal.

2. A digital time base corrector as in claim 1, further comprising:

a circuit generating a color burst signal component in said digital signal and said circuit calculating a trigonometric function.

3. A digital time base corrector as in claim 1, further comprising:

a circuit generating a color burst signal component in said digital signal and said circuit calculating a trigonometric function; and an error circuit separating and extracting a horizontal sync signal component in said digital signal and said error circuit calculating an error signal.

4. A digital time base corrector comprising:

an A/D converter, operating to convert a reproduction video signal which is read out and reproduced from a recording medium into a digital signal;

an image memory, having a capacity to store two lines of horizontal scanning of said video signal, one stored line of horizontal scanning representing a first video phase of said video signal, and another stored line of horizontal scanning representing a second video phase of said video signal, said first video phase being different than said second video phase;

a write clock producing element, producing a write clock having a phase which is synchronized with a time base fluctuation included in said reproduction video signal;

a read clock producing element, producing a read clock having a predetermined period;

memory control means for controlling writing of said digital signal into said image memory in a way which is phase-synchronized with said write clock such that said first video phase is always stored as said one stored line and said second video phase is always stored as said another stored line and for controlling reading out a time-base-corrected digital signal from said image memory in accordance with said read clock such that reading of the digital signal is performed at an address where writing is normally performed substantially at a time corresponding to an even multiple of a horizontal scanning period of said video signal, so that said one stored line is always retrieved during a time of said first video phase, and said another stored line is always retrieved during a time of said second video phase;

D/A converting means for converting the time-base-corrected digital signal into an analog video signal; and drop-out detecting means for detecting a drop-out in said reproduction video signal, and determining a proper stored line depending on whether the current video phase corresponds to said video phase of said one stored line or said video phase of said another stored line and generating a drop-out detection signal indicative thereof, wherein said memory control means includes means for determining a current video phase, means for inhibiting the controlling said writing into the image memory in accordance with said drop-out detection signal, and means controlling said reading to thereafter read the stored video signal from said proper stored line to thereby maintain a previous video signal phase.

5. A time base corrector as in claim 2 wherein said memory control means controls said reading out during said drop out detection signal to read two stored lines.

6. A digital time base corrector as in claim 4, wherein said memory control means includes a circuit which determines an angle component of the signal by calculating at least one trigonometric function indicative thereof.

7. A method of digitally time-base correcting a signal, comprising the steps of:

receiving a reproduction video signal from a recording media;

converting said reproduction video signal into a digital video signal;

storing two horizontal scanning lines of said digital video signal into memory, by writing said two horizontal scanning lines of said digital video signal into said memory synchronized with a write clock that is synchronized with a phase of the reproduction video signal and such that one stored line of horizontal scanning represents a first video phase of said reproduction video signal, and another stored line of video scanning represents a second video phase of said reproduction video signal;

outputting a read-out digital video signal from said image memory during a time when drop out is not detected using a constant period read clock such that reading of the digital signal is performed at an address where writing is normally performed substantially at a time corresponding to an even multiple of a horizontal scanning period of said video signal, so that said one stored line is always retrieved during a time of said first video phase, and said another stored line is always retrieved during a time of said second video phase, converting said read-out digital video signal into an analog video signal;

detecting a drop out in the reproduction video signal; and when said drop out is detected: inhibiting writing into said image memory, determining a current video signal phase, reading out said one stored line if said first video phase is detected, and reading out said another stored line if said second video phase is detected to thereby read out a phase-correct video signal from said memory.

8. A time base corrector, comprising:

a processing circuit, connected to receive a video signal from a video source, and processing said video signal to produce a processed video signal;

a drop-out detecting circuit, receiving said processed video signal from said processing circuit, and operating to determine when a drop-out occurs in said processed video signal and producing an output indicative of drop-out;

a clock producing device, receiving said processed video signal, and producing a write clock which is synchronized with a phase of said video signal, said clock producing device also synchronized with a phase of a particular horizontal scanning line of said processed video signal which is currently being reproduced;

an image memory, storing at least two horizontal scanning lines of said processed video signal;

a write control circuit, receiving a drop-out signal from said drop-out detecting circuit and receiving said write clock from said clock producing device, and producing output signals which are connected to said image memory, said output signals controlling said image memory to read a current video signal there into only when no drop-out is detected, said current video signal being read into a portion of said image memory indicated by a phase of the write clock, and in synchronism therewith to maintain a first video phase stored in a first storage area of said image memory and to maintain a second video phase, different from said first video phase, stored in a second storage area of said image memory;

a read clock producing device, synchronized with a reference, for reading data from said image memory synchronized with a video phase of a current line; and reading of the digital signal is performed at an address where writing is normally performed substantially at a time corresponding to an even multiple of a horizontal scanning period of said video signal.

* * * * *